United States Patent [19]
Gilcreest et al.

[11] Patent Number: 5,425,458
[45] Date of Patent: Jun. 20, 1995

[54] DEVICE FOR SEPARATION AND STORAGE OF RECYCLABLE MATERIALS

[76] Inventors: Mary F. Gilcreest, 315 Clarksley Rd., Colorado Springs, Colo. 80905; John F. Svihlik, 631 Tower St. South, Colorado Springs, Colo. 80929

[21] Appl. No.: 856,439

[22] Filed: Mar. 23, 1992

[51] Int. Cl.$^6$ .......................... B07C 9/00; B65D 91/00
[52] U.S. Cl. .................... 209/655; 209/702; 209/706; 209/930; 232/43.2; 193/2 R; 100/45; 100/902
[58] Field of Search .............. 209/655, 702, 706, 707, 209/930, 630; 232/43.1, 43.2, 43.3, 44; 220/531, 909; 193/2 R, 33; 312/211; 100/45, 49, 91, 902

[56] References Cited

U.S. PATENT DOCUMENTS

| | | | |
|---|---|---|---|
| 3,976,345 | 8/1976 | Walters | 232/43.2 X |
| 4,013,551 | 3/1977 | de Feudis | 209/930 X |
| 4,026,425 | 5/1977 | Gruodis | 193/2 R X |
| 4,098,181 | 7/1978 | Schultz | 100/102 |
| 4,373,435 | 2/1983 | Grevich | 209/930 X |
| 4,469,212 | 9/1984 | DeWoolfson et al. | 194/213 |
| 4,480,737 | 11/1984 | Jamgochian et al. | 194/213 |
| 4,519,306 | 5/1985 | LaBarge et al. | 194/213 X |
| 4,542,688 | 9/1985 | Bohan | 194/346 X |
| 4,760,925 | 8/1988 | Stehle et al. | 209/930 X |
| 4,829,428 | 5/1989 | Weitzman et al. | 209/930 X |
| 4,987,988 | 1/1991 | Messina et al. | 232/43.2 X |
| 5,154,345 | 10/1992 | Shillington | 232/44 |
| 5,257,577 | 11/1993 | Clark | 209/706 X |

Primary Examiner—Robert P. Olszewski
Assistant Examiner—Tuan N. Nguyen

[57] ABSTRACT

An installation for accepting, sorting and storing recyclable materials, and providing a convenient method for third party collection. The device is comprised of a depository opening into which the waste materials are entered, a chute along which the materials travel, a series of inclined gate mechanisms which facilitate the segregation of the materials, and a divided storage area featuring a number of bins into which the segregated materials are deposited and stored. The depository is located preferably inside a building in an accessible common area. It is connected to a chute which descends through an exterior wall to connect to the storage area outside. The storage area is divided into a number of bins. The storage area can be configured to meet the requirements of the consumer, that is the number and arrangement of bins is variable. Each bin is accessible through a door on its exterior. Separation occurs inside the storage area where the materials are directed by a series of gate mechanisms into one of the predesignated bins. The storage area is accessible from the exterior, and the bins are removable, thereby facilitating unobtrusive third party collection.

10 Claims, 5 Drawing Sheets

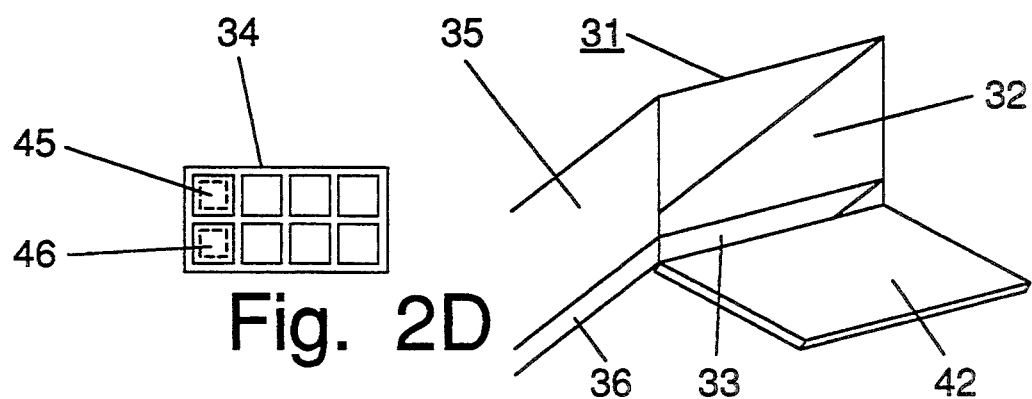
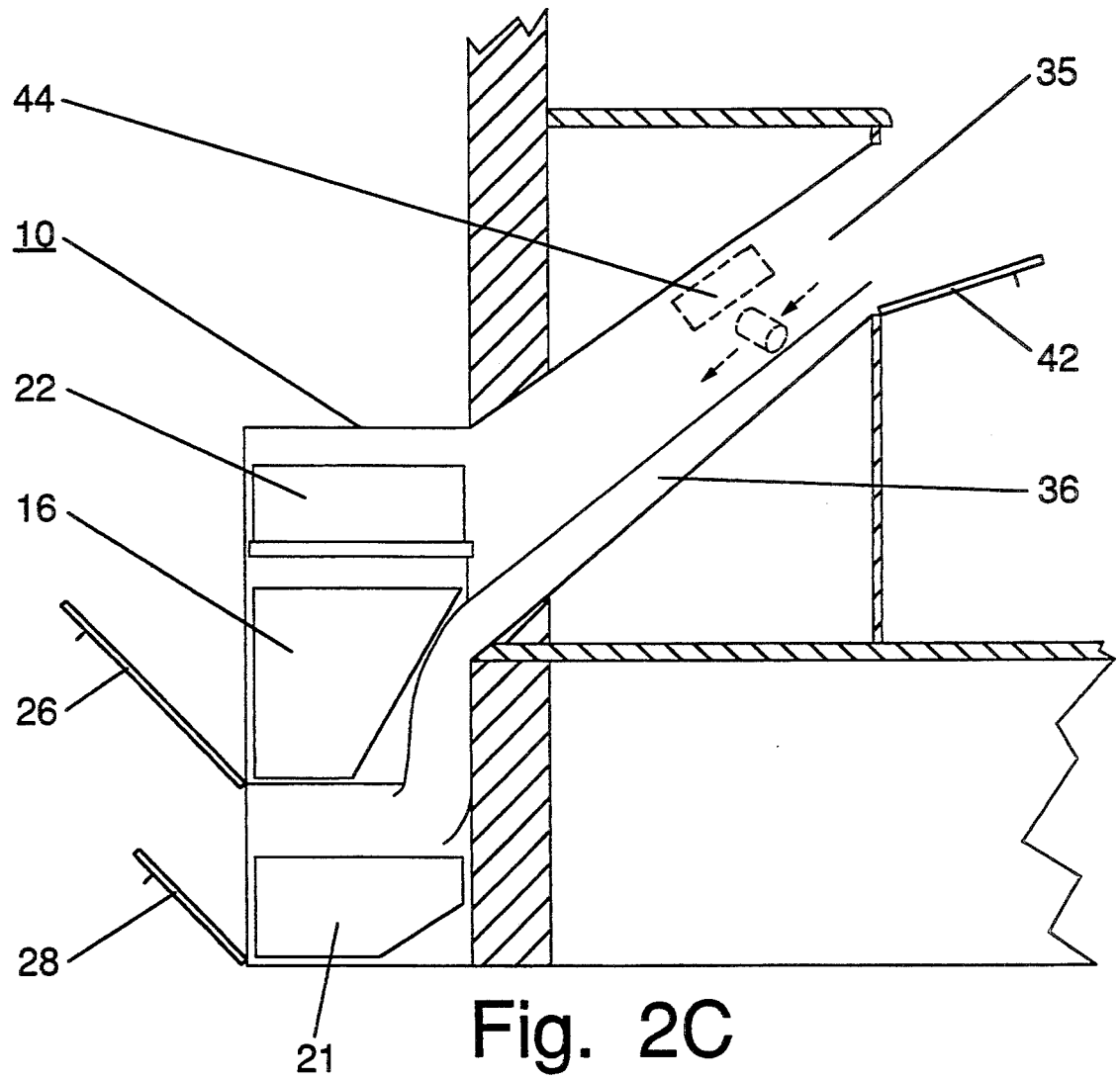

DEVICE FOR SEPARATION AND STORAGE OF RECYCLABLE MATERIALS

BACKGROUND

The invention relates to the disposal and storage of used materials, specifically a device for separating and storing recyclable materials from a single location, and providing for the collection thereof.

The popularity of recycling has become a necessity as the consumption of disposable containers is on the increase. In addition to the shrinkage of landfill space, landscape destruction associated with the extraction and processing of raw materials is a more recent ecological concern as is the economic inefficiency of such processes, in contrast to the processing of used containers. However, alarming amounts of reusable materials are still being discarded by the millions daily. One common reason for this sad statistic is that individuals find recycling inconvenient.

One disadvantage of most previous inventions found is the requirement on the part of the user to presort as well as transport the items to be recycled. Previous methods for the collection, separation and storage of recyclable materials have frequently been located in one central location, requiring the user to transport the would be garbage to the facility. The energy consumed in the transportation process is somewhat defeating to the purpose of energy conservation as well as inconvenient to participating individuals. These facilities have also been found to be limited to accepting only certain types of materials. Examples include U.S. Pat. Nos. 4,480,737, Jamgochian, Nov. 6, 1984, 4,829,428, Weltzman May 9, 1989, 4,469,212, DeWoolfson, Sep. 4, 1984 and 4,519,306, LaBarge, May 28, 1985. All these inventions are limited to glass beverage bottles and or aluminum cans. The so called third party system, as illustrated in Weltzman's patent also requires store employees to transport barrels of such materials to larger bins.

Many sorting and storing devices have been found to be mechanically complex and therefore space and energy consuming. The use of conveyor belts, magnetic separators, wheels, motors and crushers suit these inventions best for large scale applications. For example U.S. Pat. No. 4,542,688 features a lift to facilitate sorting. In U.S. Pat. No. 4,373,435 a magnetic wheel separates materials after they have been deposited down a chute. Jamgochian's invention and Stahle's U.S. Pat. No. 4,760,925, Aug. 2, 1988, are both motor driven and send unsorted waste through several steps of sorting. Many of these devices are limited to acceptable materials as well. Much space and energy is used to retrieve only a few products. An excessive use of space is illustrated in U.S. Pat. No. 4,013,551, deFeudis, Mar. 2, 1977, which features separate chutes and depositories for sorting. U.S. Pat. No. 4,098,181, issued to Edward August Schultz Jul. 4, 1978, introduces an on site sorting, processing and storage device for domestic waste. Schultz's invention features two motors which drive two grinders and two crushers each. For such a domestic application as this invention was designed, such machinery might be considered undesirably noisy and energy consumptive. Additionally, separate chutes use up space. Domestic materials collected weekly do not require so much space as to justify compressing them.

It is an object of the present invention to provide an on site means for conveniently disposing of would be waste in a manner which accommodates the recycling of the waste. Further objects of the invention are to provide a system for separating and storing materials neatly and unobtrusively, to provide convenient access for the collection of such materials, and to broaden the popularity of recycling by providing an inexpensive, convenient and unobtrusive method to do so. For larger than household applications, the invention further offers means for compacting the materials to minimize storage space requirements.

The invention is designed to be installed in any building. An inside depository offers a convenient way of disposing used materials, as usually would go into the trash. The deposited material is transported outside to be channeled to one of several bins in a divided storage area. This simple procedure can minimize the inconvenience and disorder that sorting and storing waste can cause. The bins are accessible and removable from the outside, for the convenience of waste collectors or recyclers.

The invention is designed to utilize the force of gravity in the sorting process. Only a minute expenditure of energy is required to activate the gate mechanisms which channel deposited items. The described embodiment includes a control panel for this purpose, thus the sorting is the individual's decision. One preferred embodiment provides for an automatic sorting technique based on scanning the deposited materials. The reading would activate the gate mechanisms.

The present invention is designed to adapt to various sizes of buildings, as its capacity is variable in accordance with its intended application. The simple design permits the invention to be easily and inexpensively installed into existing buildings, potentially increasing drastically the volume of recyclable materials readily sorted and available to collectors. A collective widespread usage of the present invention could notably reduce the rates at which landfill space and natural resources are consumed.

DESCRIPTION OF DRAWINGS

FIG. 2C shows a cross section of the device indicated by dotted line 2C—2C in FIG. 2.

FIG. 2D shows a view of the initial user end of the device, i.e. the depository and the control panel.

DESCRIPTION OF INVENTION

Figure 1:
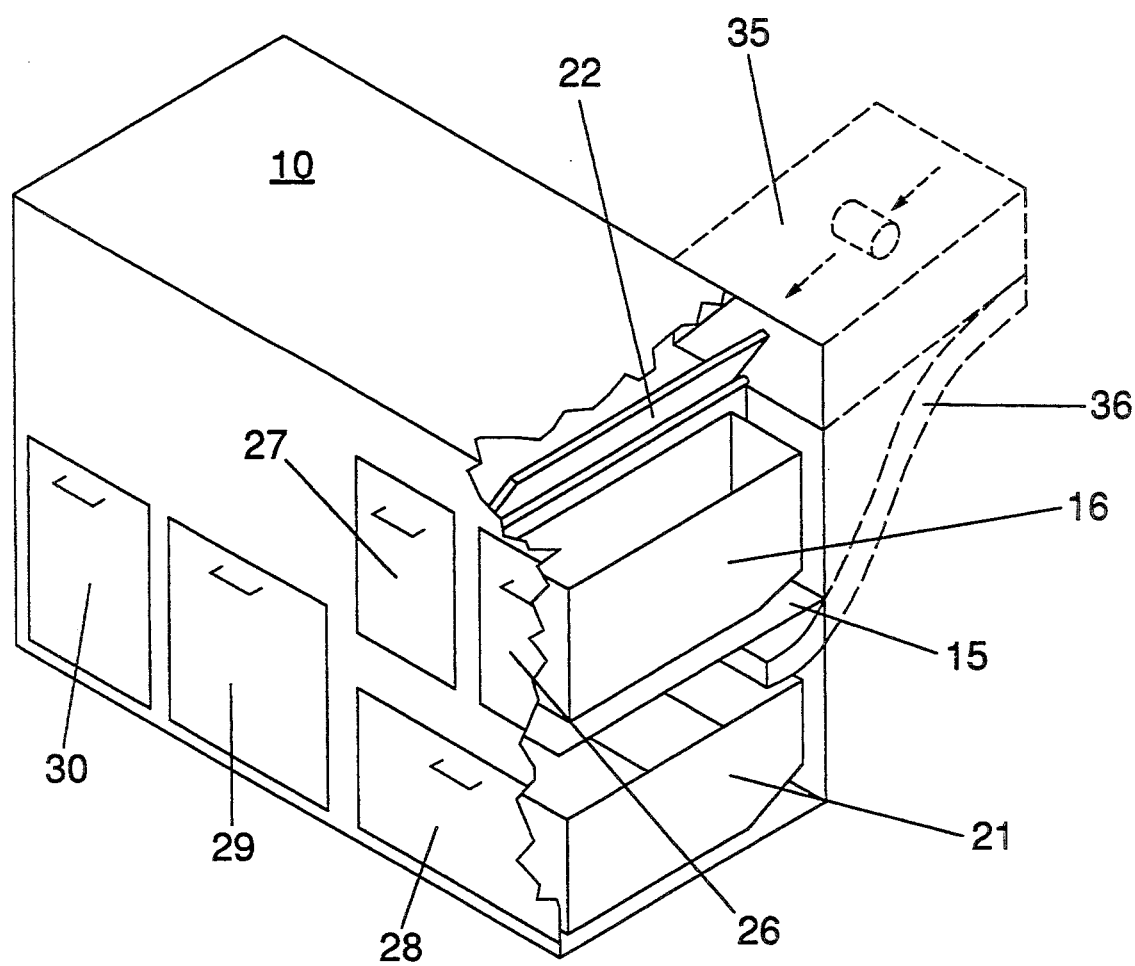
FIG. 1 illustrates an overall perspective view of the device as installed in a building with a cutaway view showing some of the internal components.
Figure 2:
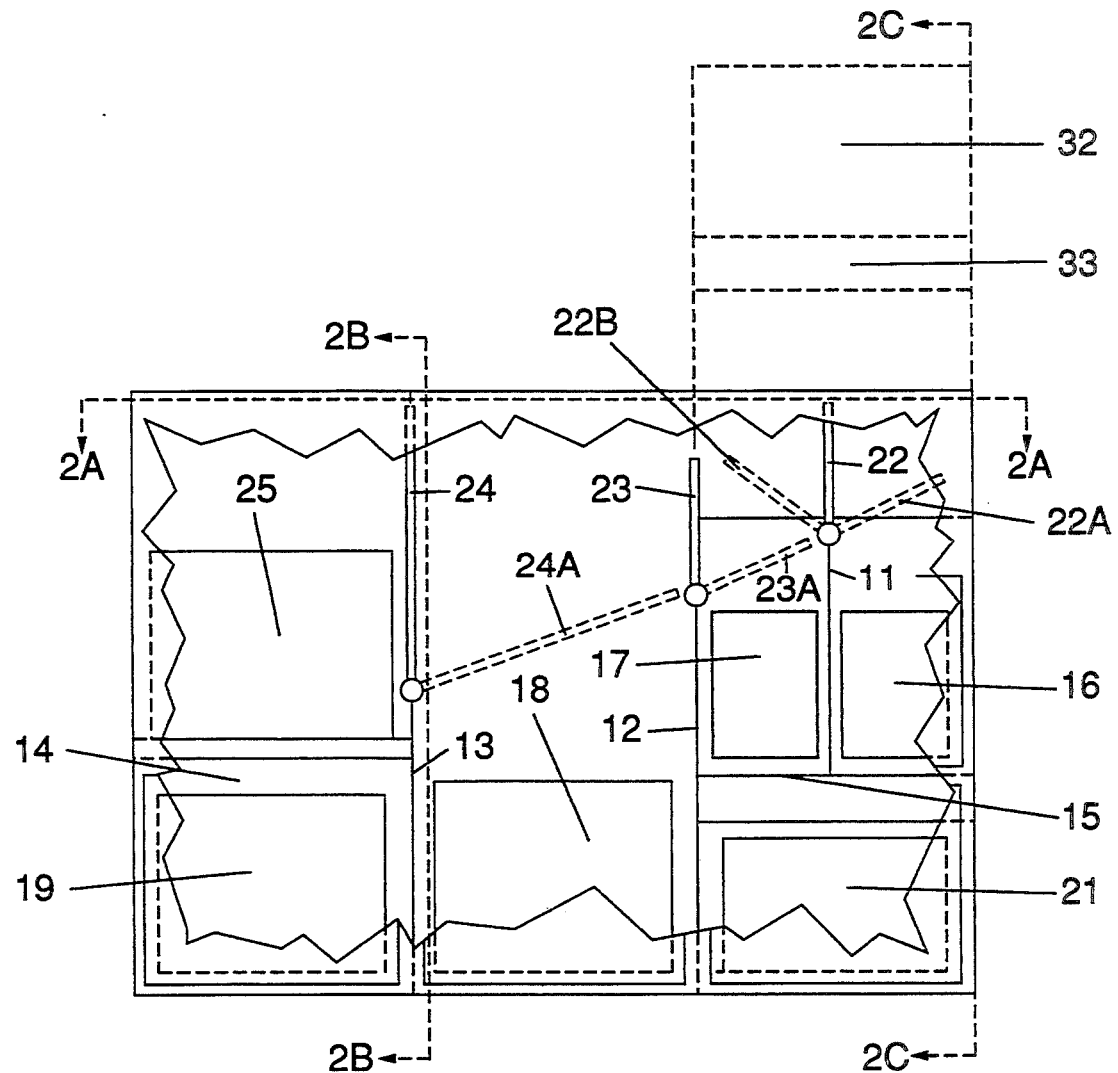
FIG. 2 shows a cut away of the device, as viewed from the outside of the building in which it is installed.
Figure 2B:
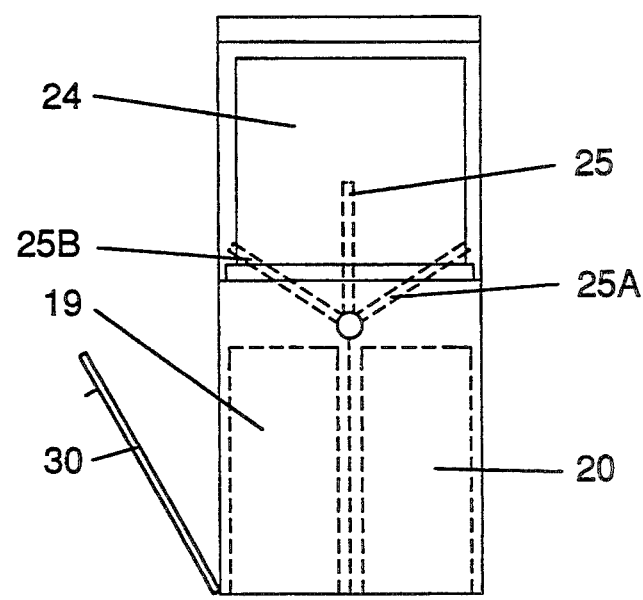
FIG. 2B shows the vertical cross section indicated by dotted line 2B—2B in FIG. 2.
Figure 2A:
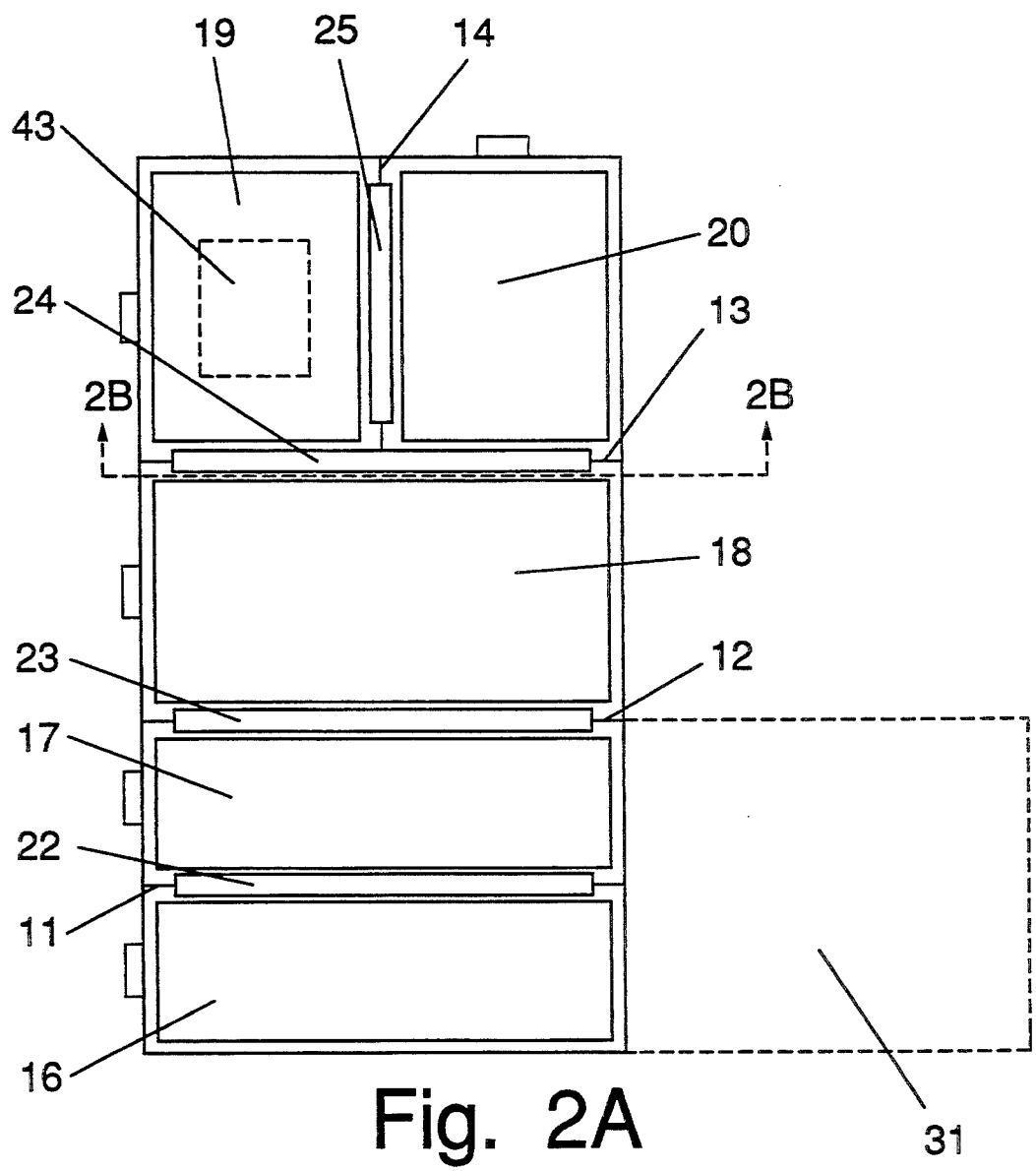
FIG. 2A shows an open top view of the horizontal section indicated by dotted line 2A—2A in FIG. 2.

An overall view of the invention, FIG. 1, shows the largest component, a storage area, 10, is located on the outside of a building in which the invention is installed, attached to an exterior wall. The cutaway reveals two open top bins, 16 and 21. Several doors, 26, 27, 28, 29 and 30, are featured on the outermost periphery of the storage area, each corresponding to one bin. The storage area as shown in FIG. 2 shows that it is comprised of an enclosed hollow structure divided internally by a number of dividing walls 11, 12, 13, 14 and 15, which partition the storage area into a number of sections, the size, number and configuration to be determined by the application of the user. FIG. 2 shows that vertical dividing walls, 11, 12, 13,and 14, are arranged in a series, becoming sequentially lesser in height, all being lesser in vertical dimension than the storage area. Each dividing wall has a gate, 22, 23, 24 and 25, hinged atop. Each section is closely fitted with a removable, open top bin. The preferred embodiment illustrates five bins, 16, 17, 18, 19, and 21. FIG. 2A, an open top view, reveals a sixth bin, 20, adjacent to bin 19, both bins 19 and 20 being perpendicular to bin 18. A cross section of bins 19 and 20 and gate 25 is shown in FIG. 2B. Each bin is removable and accessible from the exterior and is designed in the same shape as, but slightly lesser in dimension than, the interior sections of the storage area, and is open on top.

FIG. 2D presents the second component of the invention, a transport means, 31, comprised of a divided depository, preferably inside a cabinet either above or below a counter top, and a divided chute. A control panel, 34, is located within the general vicinity. The control panel is adaptable for use by people of all languages, including braille, and all levels of literacy. The control panel features buttons which correspond to the sorting functions. Braille symbols, 45 or international symbols, 46 on the control panel buttons facilitate users of all languages.

Upper depository, 32, is comprised of an opening of a size sufficient enough to accommodate the entry of a variety of materials such as, but not limited to, glass, aluminum, other metals and plastics. This depository connects to upper chute, 35. A lower depository, 33, is sized for depositing paper neatly. The paper depository is connected to lower chute, 36. FIG. 2C shows a door, 42, accessing the depository. Chutes 35 and 36 run parallel, descending through the cabinet, through the exterior wall and to storage area 10. Upon approaching the interior of the storage area, the chutes diverge, chute 35 meeting with gate 22 above bins 16 and 17, and chute 36 further descending into bin 21.

The area above the bins, best seen is FIG. 2, will be referred to as the conduit, but is not specified in the drawings, due to its variable nature, described below.

Figure 3:
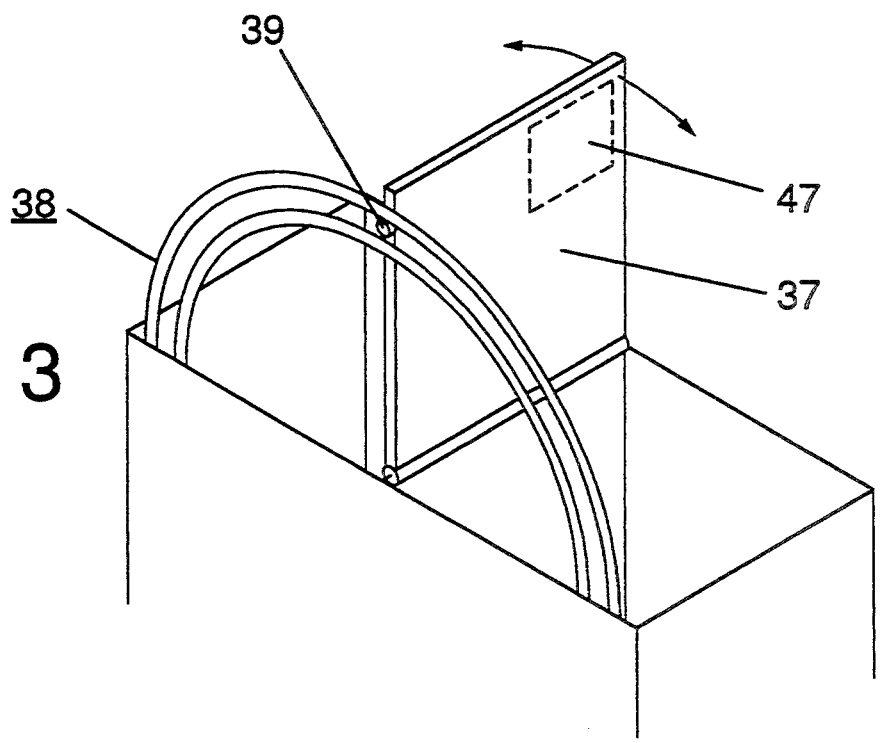
FIG. 3 is a detail of the gate mechanism shown in FIG. 2, parts 22, 23, 24, and 25.
Figure 4:
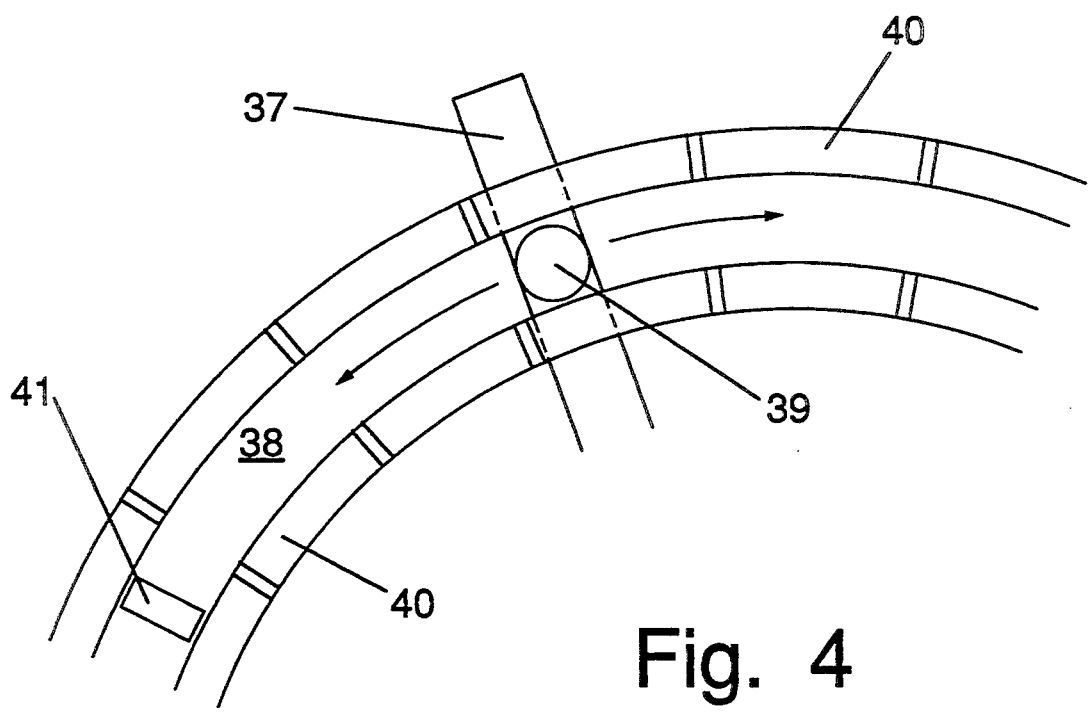
FIG. 4 is a closeup view of pin 39 attached to gate 37 and attached to track 38.

Along the conduit are located a number of the previously mentioned gate mechanisms, 22, 23, 24, and 25, essentially one per vertical dividing wall. Each gate mechanism, detailed in FIG. 3, is comprised of a gate, 37, hinged atop and parallel to each of the vertical dividing walls and connected by a pin, 39, to a track, 38. FIG. 4 shows a closeup of the track, which is comprised of a series of electromagnetic coils, 40, and features adjustable stops, 41, so that the gate is movable to a number of designated positions, via a command from the control panel.

The position of each gate conceals the top of either one or the other of the adjacent bins. The collective positions of the gate mechanisms, in conjunction with the descending heights of the vertical dividing walls, determine the path of the conduit, as shown in FIG. 2, in dotted lines 22A, 22B, 23A and 24A.

OPERATION OF INVENTION

FIG. 2D illustrates the initial point of use of the invention. The user approaches the invention, at depository 32, first selecting at control panel 34, the category of material to be deposited. With collective efforts across the packaging and recycling industries, hopefully the near future would provide a system for scanning an imprinted or etched code for purposes of automatic sorting. An alternate embodiment provides a scanning device, 44 which is located inside the depository opening. The device is comprised of a beam which determines the nature of the material being deposited. For now the user will make the selection manually. The selection activates a device which draws the gate mechanisms into the proper positions to channel the deposited material into the selected bin. FIG. 3, a detail of one possible method for operating the gate mechanisms, shows that each gate mechanism is made up of a gate, 37, hinged to the top edge of each bin dividing wall. A pin, 39, made of magnetic material attaches to at least one vertical edge of the gate and fits freely into a track, 38, which, detailed in FIG. 4, is comprised of a double arched series of electromagnetic coils, 40, situated perpendicular to the gate. Upon command at the control panel, the coils are sequentially charged and uncharged in the direction which the pin is to follow. Adjustable stops, 41, located along the track, determine where the gate is to be positioned. Depending on the circuit activated, the pin is pulled by the magnetic charge into the proper position as illustrated in FIG. 2 positions 22A, 22B, 23A and 24A. When the gate is to return to an opposite position, the electromagnetic charge sequence is reversed and the guide is drawn in the opposing direction. An alternate method for moving the gates involves a spring activated solenoid, 47 in place of the magnetic track. When the solenoid is activated it pushes the gate into position.

Referring to FIG. 2D, the user deposits the selected category of material through depository 32. FIG. 2C shows that the material descends from depository 32, through chute 35 and into the conduit area of storage area 10. The material first encounters gate 22, and is then directed by the collective positions of the gate mechanisms, to its appropriate bin for storage until collected. When newspaper is deposited into depository 33, the newspaper will slide neatly down newspaper chute 36, and exit into bin 21, below bins 16 and 17.

Referring to FIG. 2 for example, when clear glass is deposited, gate 22 is in position 22B. The glass then drops into bin 16, which may contain a cushioning material, and the glass falls gently to the bottom of the bin. When colored glass is to be deposited, gate 22 is in position 22A and gate 23 is in the upright position. The colored glass is then directed into bin 17 which may also contain a cushioning material to prevent breakage.

When plastic is deposited, gate 22 is in position 22A, gate 23 is in position 23A, and gate 24 is upright. The plastics proceed into bin 18. The next two adjacent bins 19 and 20, FIG. 2A, feature a dividing wall 14 which is perpendicular to the adjoining dividing wall 13, so that both bins are perpendicular to bin 18. One bin, 19, is for aluminum and the other bin, 20, is for steel and other metals. Referring again to FIG. 2, when aluminum is deposited, gate 22 is in position 22A, gate 23 is in position 23A, gate 24 is in position 24A and gate 25 is in position 25B, FIG. 2B, so that the materials are channeled into bin 20. When other metals are deposited, gate 25 pivots into position 25A, thereby directing the metals into bin 19. Gates 22, 23 and 24 remain as previously described for depositing aluminum. An alternate embodiment provides for housing a typical trash compacting crusher, 43 inside any of the bins.

The control panel is located near the depository and directs the electrical signals to the appropriate mechanisms at the time the selection is made. The control panel is comprised of a number of buttons naming each category of material the invention is designed to accept. Optional buttons designate optional functions such as crushing. The control panel buttons feature the language of the user. Each button is electrically wired to the appropriate electrical receptor at each gate mechanism and other optional components of the device. The depository cannot be accessed until a selection is made at the control panel. The various material selections will activate the corresponding gate mechanisms in the sequence described above for each selection. The control panel is inactivated whenever the outside bins are accessed for service or material removal. FIG. 1 shows that the bins are accessible for the removal of the collected material through the exterior bin doors, 26, 27, 28, 29, and 30.

CONCLUSION

The collective results of individual participation and responsibility is the key to successful environmental salvation. The device for the separation and storage of recyclable materials, installed in residences and businesses will provide a convenient and economical means to facilitate the recycling of used materials across a broad spectrum of society. The separation, storage and removal of recyclable items is easily handled, in a few steps, at the source. The sorting of recyclable materials by an agency, in preparation for recycling, is a costly and time consuming process. The present invention addresses the problem of waste disposal and sorting in preparation for recycling at the individual level, thereby providing the opportunity for individual participation, which eliminates the need for a costly specialized service and simultaneously boosts participation levels. The invention is designed to be inexpensive to construct and simple to install. It will be apparent to those skilled in the art that other uses can be applied to the invention without departing from its scope and spirit. For example, sorting laundry or coins. The illustrated preferred embodiment should not be construed to limit the invention to that description. The scope will be determined by the appended claims and their legal equivalents.

We claim:

1. A device providing means for separating and storing materials from a single location and facilitating third party collection, comprising:
   a) an enclosed, hollow structure comprising a storage area,
   b) a series of dividing walls traversing said storage area, all lesser in vertical dimension than said storage area, each being of lesser vertical dimension in a sequentially descending fashion,
   c) said dividing walls internally dividing said storage area into a preferred number of sections, said sections being accessible from the exterior of said storage area,
   d) a number of removable bins of slightly lesser dimensions than each storage section and fitting inside each section and featuring an open top to facilitate the receiving of materials from above, said bins facilitating the removal of stored contents,
   e) a series of gate mechanisms, each being attached to the uppermost edge of one of said vertical dividing walls, said gate mechanisms comprised of an upright plate, referred to as the gate, that is movable into one or another position of concealing one or the other adjacent section, the collective positions of said gate mechanisms in conjunction with said dividing walls creating an angle of descent which facilitates gravitational movement of deposited items thereby providing means for separating deposited items,
   f) a means for transferring materials from the user to the storage area, comprising:
      a depository opening into which the items may be entered, said depository being located in or near a common use area, and
      a chute, connecting said depository to said storage area, the lower end of said chute terminating at the storage area and the upper end adjoining the depository, said chute situated at such an incline as to facilitate gravitational movement of the deposited items toward said storage area, said storage area being located opposite and laterally below said depository, whereby recyclable materials can be conveniently separated, stored and collected at the point of generation for redemption and recycling.

2. The device of claim 1 as installed in a building, said building having several exterior walls, in which said storage area is located outside the building adjacent one exterior wall, said depository is located inside the building, and said chute transects same said exterior wall to connect the depository to the storage, whereby the materials are removed from the interior of the building after depositing them and the sorted materials are collected from outside.

3. The device of claim 1 further including means for crushing deposited items, whereby the device can be installed in densely occupied buildings, and require a minimal amount of space for storage.

4. The gate mechanism of claim 1, comprising:
   a) a plate, referred to as the gate, hinged atop and parallel to said dividing wall, so that it is pivotable to a number of predetermined positions,
   b) at least one track situated perpendicular to said plate, said track composed of two series of electromagnetic coils arranged in parallel arches,
   c) a pin made of magnetic material which links said plate to said track
   d) a means for controlling electromagnetic energy flow to said track so that the charge travels through said series of coils in either direction, whereby the charge to the coils causes said pin to draw the gate in the direction in which the charge travels, thereby positioning the gate for sorting.

5. The gate mechanism of claim 4 wherein said track is horizontal and said pin is movable along the vertical edge of the gate whereby the plate may be pivoted to a number of positions.

6. Alternate means for operating the gate mechanism of claim 1 comprising
   a) a spring activated solenoid installed perpendicular to said gate, and embedded into the perpendicular wall on either side of the gate, so that said solenoid when recoiled is flush to the surface of the wall, and when uncoiled strikes the breadth of the plate, thereby causing said plate to pivot
   b) an arrangement of protruding nubs situated along the surface perpendicular to said gate, causing said gate to stop at the location of said nubs c) an electronic signal which activates said solenoid, said signal being connected to said solenoid on one end and to said control panel on the ether end, whereby a selection made at the controls will activate said solenoid, in turn moving the gate into proper position.

7. Alternate means for operating the gate mechanism of claim 1, comprising:

a) means for scanning deposited materials, b) a readable code found on all disposable containers, c) a means for translating scanned code to said gate mechanisms, whereby the reading prescribes the collective orientation of the gates.

8. The device of claim 1 further including international symbols on buttons of said control panel, so that people of all languages and levels of literacy can utilize the device.

9. The device of claim 1 further including braille on buttons of said control panel, so that the device may be utilized by the visually impaired.

10. The device of claim 1 further including means for securing access to said bins from the outside, as a safety precaution.

* * * * *

UNITED STATES PATENT AND TRADEMARK OFFICE
CERTIFICATE OF CORRECTION

PATENT NO.    : 5,425,458
DATED         : June 6, 1995
INVENTOR(S)   : Mary F. Gilcreest
                John F. Svihlik It is certified that error appears in the above-indentified patent and that said Letters Patent is hereby corrected as shown below:

Cover sheet: Inventors' addresses (delete)    Mary F. Gilcreest
            631 Tower Street South
            Colorado Springs, Colorado 80905

(add)       John F. Svihlik
            315 Clarksley Road
            Manitou Springs, Colorado 80829

Column 5, line 3: insert the following phrase after "... selection is made." and before "The control panel is comprised..."

"The alternate scanning device is connected
to the gate mechanisms and activates the
gate positions depending on the type of
material scanned."

Signed and Sealed this

Third Day of September, 1996

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,425,458

DATED : June 20, 1995

INVENTOR(S) : Mary F. Gilcreest
John F. Svihlik

It is certified that error appears in the above-identified patent and that said Letters Patent is hereby corrected as shown below:

On the cover page, item [76] Inventors: should read

--Mary F. Gilcreest
631 Tower Street South
Colorado Springs, Colorado 80905

John F. Svihlik
315 Clarksley Road
Manitou Springs, Colorado 80829

Column 5, line 3: insert the following phrase after ".... selection is made."
and before "The control panel is comprised ..."

"The alternate scanning device is connected to the
gate mechanisms and activates the gate positions
depending on the type of material scanned."

This certificate supersedes certificate of correction issued September 3, 1996.

Signed and Sealed this

Twenty-fourth Day of December, 1996

Attest:

BRUCE LEHMAN

*Attesting Officer*  *Commissioner of Patents and Trademarks*